(12) United States Patent
Li et al.

(10) Patent No.: US 9,999,255 B2
(45) Date of Patent: Jun. 19, 2018

(54) ELECTRONIC CIGARETTE WITH A BLOCKING MODULE

(71) Applicant: Shenzhen First Union Technology Co., Ltd., Shenzhen City, Guangdong Province (CN)

(72) Inventors: Yonghai Li, Shenzhen (CN); Zhongli Xu, Shenzhen (CN); Yikuan Zhu, Shenzhen (CN); Yunping Zhong, Shenzhen (CN)

(73) Assignee: SHENZHEN FIRST UNION TECHNOLOGY CO., LTD., Shenzhen, Guangdong Province (CN)

( * ) Notice: Subject to any disclaimer, the term of this patent is extended or adjusted under 35 U.S.C. 154(b) by 0 days. days.

(21) Appl. No.: 15/409,521

(22) Filed: Jan. 18, 2017

(65) Prior Publication Data

US 2017/0208868 A1 Jul. 27, 2017

(30) Foreign Application Priority Data

Jan. 21, 2016 (CN) .......................... 2016 2 0061769
Jan. 25, 2016 (CN) .......................... 2016 2 0072375

(51) Int. Cl.
| | |
|---|---|
| *A24F 13/00* | (2006.01) |
| *A24F 47/00* | (2006.01) |
| *H05B 1/02* | (2006.01) |
| *F16J 15/02* | (2006.01) |
| *B65D 81/26* | (2006.01) |

(52) U.S. Cl.
CPC .......... *A24F 47/008* (2013.01); *B65D 81/264* (2013.01); *F16J 15/022* (2013.01); *H05B 1/0244* (2013.01); *H05B 2203/021* (2013.01)

(58) Field of Classification Search
CPC .... A24F 47/008; A24F 47/002; B05B 1/0244; F16J 15/0022
USPC ......................................... 131/329, 328, 273
See application file for complete search history.

(56) References Cited

U.S. PATENT DOCUMENTS

| | | | |
|---|---|---|---|
| 7,766,018 B2 | 8/2010 | Roth et al. | |
| 8,505,548 B2 * | 8/2013 | Hearn | A24F 47/002 128/200.14 |
| 8,528,569 B1 * | 9/2013 | Newton | A61M 15/06 128/202.21 |

(Continued)

FOREIGN PATENT DOCUMENTS

WO 97/37550 A1 10/1997

*Primary Examiner* — Hae Moon Hyeon
(74) *Attorney, Agent, or Firm* — Cheng-Ju Chiang

(57) ABSTRACT

An electronic cigarette is disclosed. The electronic cigarette comprises a sleeve, a battery module, an atomizing unit and a blocking module arranged in the sleeve and a reservoir formed in the sleeve. The atomizing unit is electrically connected to the battery module, the blocking module is configured to isolate the battery module and the reservoir, a ventilation hole is disposed on the blocking module for achieving air communication between the atomizing unit and the battery module; wherein the ventilation hole is in the closed state before a first use of the electronic cigarette; when the electronic cigarette is used, the blocking module is switched to make the ventilation hole in the open state, so as to allow air to enter the ventilation hole and pass through the atomizing unit to carry the aerosol generated by the atomizing unit.

19 Claims, 8 Drawing Sheets

(56) References Cited

U.S. PATENT DOCUMENTS

| | | | |
|---|---|---|---|
| 8,770,187 B2* | 7/2014 | Murphy | A24F 47/002 128/200.14 |
| 9,022,039 B2* | 5/2015 | Hearn | A24F 47/002 128/200.11 |
| 2011/0209717 A1 | 9/2011 | Han | |
| 2013/0192615 A1* | 8/2013 | Tucker | H01C 17/00 131/328 |
| 2013/0312777 A1 | 11/2013 | Burghardt | |
| 2014/0332021 A1* | 11/2014 | Li | A24F 47/008 131/329 |
| 2014/0334803 A1* | 11/2014 | Li | H05B 3/03 392/394 |
| 2015/0157054 A1 | 6/2015 | Liu | |
| 2015/0164142 A1* | 6/2015 | Li | F22B 1/288 131/329 |
| 2015/0196056 A1* | 7/2015 | Liu | H05B 1/0244 131/328 |
| 2015/0216236 A1* | 8/2015 | Bless | A24F 47/008 131/328 |
| 2015/0238723 A1 | 8/2015 | Knudsen | |
| 2015/0335070 A1 | 11/2015 | Sears et al. | |
| 2016/0128385 A1 | 5/2016 | Lin | |
| 2017/0020196 A1* | 1/2017 | Cameron | A24F 47/008 |
| 2017/0071260 A1* | 3/2017 | Li | A24F 47/008 |

* cited by examiner

ELECTRONIC CIGARETTE WITH A BLOCKING MODULE

CROSS REFERENCE TO RELATED APPLICATIONS

This application claims priority to Chinese Patent Application No. 201620061769.9 filed on Jan. 21, 2016 and Application No. 201620072375.3 filed on Jan. 25, 2016, which are hereby incorporated by reference herein as if set forth in its entirety.

TECHNICAL FIELD

The present disclosure generally relates to the field of electronic cigarette, and more particular relates to an electronic cigarette which has a longer shelf life.

BACKGROUND

As the substitute of the traditional cigarette, electronic cigarette is accepted by more and more smokers, owing to its harm to humans is reduced largely, and its fashion sense as an electronic product.

Currently, being manufactured in plant, the electronic cigarette reaches users after passing through storage, transportation, sales and other link, that is, the electronic cigarette may be stored for a long time from being manufactured to the first use.

Because of the long-term storage of the electronic cigarette and influence of the environmental factor, such as air pressure, temperature etc., the tobacco liquid may leak and contaminate the battery module, which may be potentially dangerous, and at the same time the leaking tobacco liquid may be oxidized in air, which may produce harmful substances, and is not conducive for a long-term storage, and may increase the cost of an enterprise indirectly.

SUMMARY

Embodiments of the present disclosure provide an electronic cigarette, which guarantees the sealing and no leakage of the tobacco liquid in the electronic cigarette, so as to improve the safety and reliability of the electronic cigarette.

One embodiment of the present disclosure is: providing an electronic cigarette, which comprises a sleeve, a battery module, a reservoir, an atomizing unit and a blocking module; wherein an end of which is provided with a mouthpiece, and the other end of which is provided with an analog cigarette end; the battery module is arranged in the sleeve; the reservoir is formed in the sleeve and configured to contain tobacco liquid; the atomizing unit is a arranged in the sleeve, wherein the atomizing unit is electrically connected to the battery module, and is configured to atomize the tobacco liquid to form aerosol; the blocking module is arranged in the sleeve and configured to isolate the battery module and the reservoir, wherein a ventilation hole is disposed on the blocking module for achieving air communication between the atomizing unit and the battery module; wherein the blocking module is switchable so as to switch the ventilation hole between a closed state and an open state, the ventilation hole is in the closed state before a first use of the electronic cigarette; when the electronic cigarette is used, the blocking module is switched to make the ventilation hole in the open state, so as to allow air to enter the ventilation hole and pass through the atomizing unit to carry the aerosol generated by the atomizing unit.

Wherein, the blocking module comprises: a sealing stopper configured to isolate the battery module and the reservoir, wherein the ventilation hole is disposed on the sealing stopper; and a plugging block plugged in the ventilation hole such that the ventilation hole is in the closed state before the first use of the electronic cigarette; wherein the ventilation hole is switched to be in the open state when the plugging block is removed from the ventilation hole.

Wherein, the electronic cigarette further comprises a thimble, and the sleeve further comprises a pinhole disposed at a place thereof corresponding to the plugging block, the thimble is configured to insert into the pinhole and push the plugging block away from the ventilation hole.

Wherein, the ventilation hole is a stepped hole, an end of the plugging block is plugged in the stepped hole, the other end of the plugging block is abutted against the battery module or spaced away from the battery module; the plugging block comprises a blocking portion matching with the stepped hole and an extending portion extending outward from the blocking portion, and the blocking portion has a size smaller than that of the extending portion.

Wherein, the sleeve comprises a first sub-sleeve and a second sub-sleeve which are detachably connected to each other; the reservoir, the atomizing unit and the block module are assembled in the first sub-sleeve, the battery module is assembled in the second sub-sleeve; and the plugging block is removable under a condition of the first sub-sleeve and the second sub-sleeve being separated from each other.

Wherein, the reservoir, the atomizing unit and the sealing block are assembled to form an integral atomizing assembly, the atomizing assembly is detachably arranged in the sleeve such that the atomizing assembly can be taken out from the sleeve to unplug the plugging block from the ventilation hole when using the electronic cigarette.

Wherein, the atomizing unit is electrically connected to the battery module via a wire, the wire has a length larger than an axial length of the atomizing assembly.

Wherein, the length of the wire is 1.2 to 2 times of the axial length of the atomizing assembly.

Wherein, the sealing block is made of elastic silica gel, and the plugging block is made of elastic silica gel or metal.

Wherein, the atomizing unit is electrically connected to the battery module via an electrode terminal.

Wherein, the sleeve comprises a first sub-sleeve and a second sub-sleeve which are connected rotatably to each other, the blocking module comprises a first sub-block having a first through-hole and a second sub-block having a second through-hole, the first through-hole of the first sub-block and the second through-hole of the second sub-block compose the ventilation hole, the first sub-block is arranged in the first sleeve, and the second sub-block is arranged in the second sleeve; the first through-hole of the first sub-block and the second through-hole of the second sub-block are deviated from each other before the first use of the electronic cigarette so that the ventilation hole is in the closed state; and when using the electronic cigarette, the first sleeve and the second sleeve are rotated relatively to each other, to align the first through-hole of the first sub-block and the second through-hole of the second sub-block with each other, such that the ventilation hole is in the open state.

Wherein, the atomizing unit comprises an absorption element and a heating element in contact with the absorption element, at least one end of the absorption element extends to the reservoir to suck the tobacco liquid therein and is configured to provide the tobacco liquid for being atomized by the heating element.

Wherein, the liquid absorbing element is a micro-porous ceramic rod, and the heating element is a heating wire wrapping around the micro-porous ceramic rod.

Wherein, the electronic cigarette further comprises a ventilation tube arranged in the sleeve, an end of the ventilation tube is mounted on the blocking module and communicated with the ventilation hole, and the other end of the ventilation tube is communicated with the mouthpiece; the ventilation tube, the sleeve and the blocking module define an annular space as the reservoir, and the heating element is arranged in the ventilation tube.

Wherein, the electronic cigarette further comprises an oil cup, a connecting base and a ventilation tube; the oil cup is detachably arranged in an end of the sleeve near the mouthpiece, the blocking module is tightly mounted on an end of the oil cup far away from the mouthpiece; the connecting base is arranged in the oil cup, and is mounted on the blocking module; the ventilation tube is arranged in the oil cup, an end of the ventilation tube is mounted on the connecting base, and is communicated with the ventilation hole, and the other end of the ventilation tube is mounted on the end of the oil cup near the mouthpiece, and is communicated with the mouthpiece; the heating element is arranged in the ventilation tube; the connecting base, ventilation tube, oil cup and the blocking module define an annular space as the reservoir.

Wherein, the connecting base is hollow, in which a locking ring is disposed, the end of the ventilation tube is inserted into the connecting base and is limited by the locking ring; the end of the oil cup near the mouthpiece extends inward to form a hollow protrusion, the other end of the ventilation tube is stuck by the protrusion Wherein, the reservoir further comprises a carrier configured to absorb the tobacco liquid, wherein the carrier has a tubular shape and is inserted into the sleeve.

Wherein, the carrier is an oil-storing cotton.

Wherein, the analog cigarette end comprises a light-emitting element and a transparent cover, and the light-emitting element is arranged between the transparent cover and the battery module.

Wherein, the battery module comprises a battery and a controller electrically connected to the battery, the controller is configured to light the light-emitting element and control the atomizing unit to atomize the tobacco liquid when sensing an action of smoking.

Beneficial effects of the disclosure may be as follows: different from the prior art, in the disclosure, a blocking module is arranged in the sleeve to isolate the battery module and the reservoir, which may guarantee an excellent sealing of the electronic cigarette before the first use of the electronic cigarette to make sure that the tobacco liquid would not leak no matter how the air pressure and temperature change, therefore, the safety and reliability of the electronic cigarette are increased. Furthermore, the electronic cigarette of the present disclosure can prevent the air from getting into the sleeve, and prevent the tobacco liquid oozed from the atomizing unit from being oxidized, hence the time for storing can be extended, and the operating costs of an enterprise can be reduced. When the electronic cigarette is used, what needs to do is switching the blocking module to make the ventilation hole in an open state to allow air to flow into the sleeve, which is convenient and time-saving.

DETAILED DESCRIPTION

For a thorough understanding of the present disclosure, numerous specific details are set forth in the following description for purposes of illustration but not of limitation, such as particularities of system structures, interfaces, techniques, et cetera. However, it should be appreciated by those of skill in the art that, in absence of these specific details, the present disclosure may also be carried out through other implementations. In other instances, a detailed description of well-known devices, circuits, and methods is omitted, so as to avoid unnecessary details from hindering the description of the disclosure.

Figure 1:
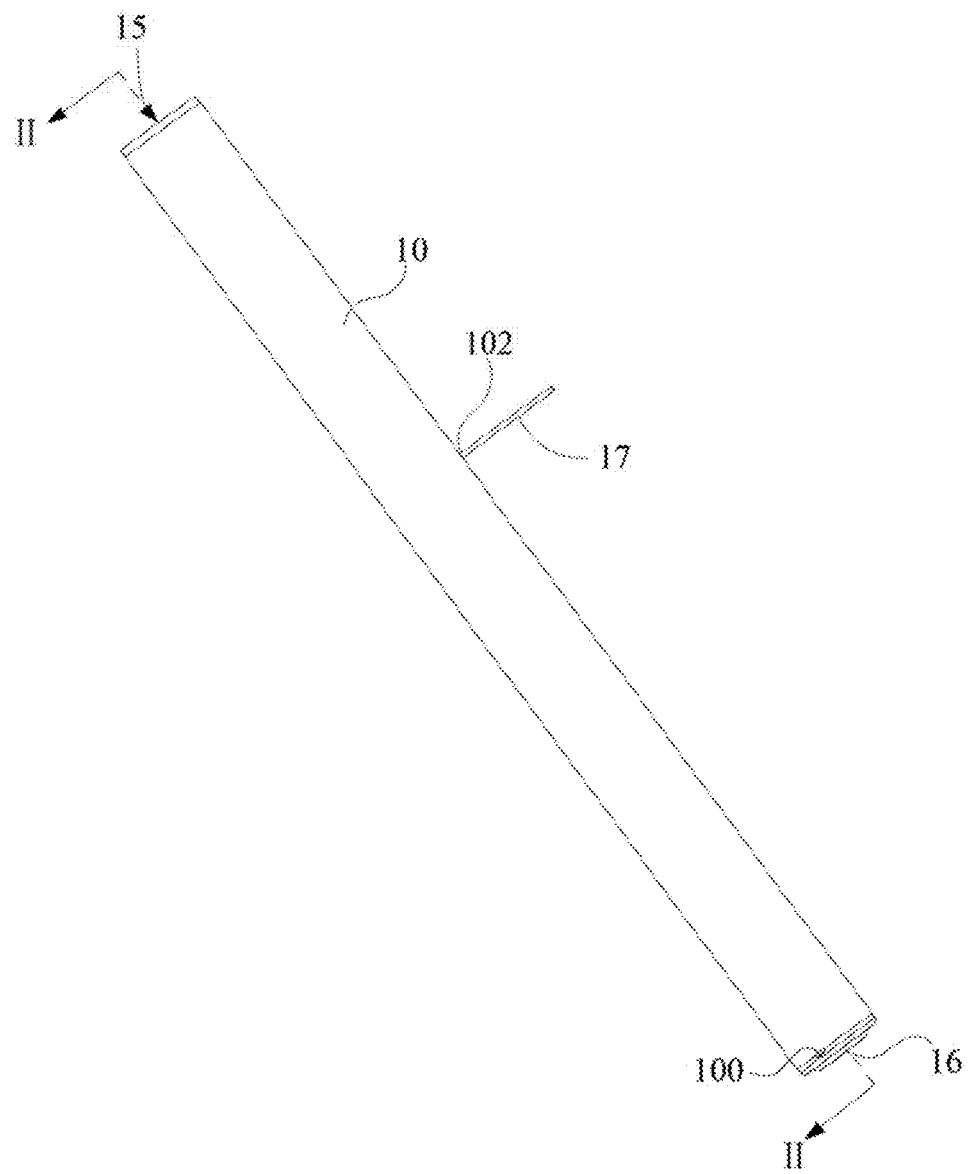
FIG. 1 is a perspective view of an electronic cigarette according to a first embodiment of the disclosure.
Figure 2:
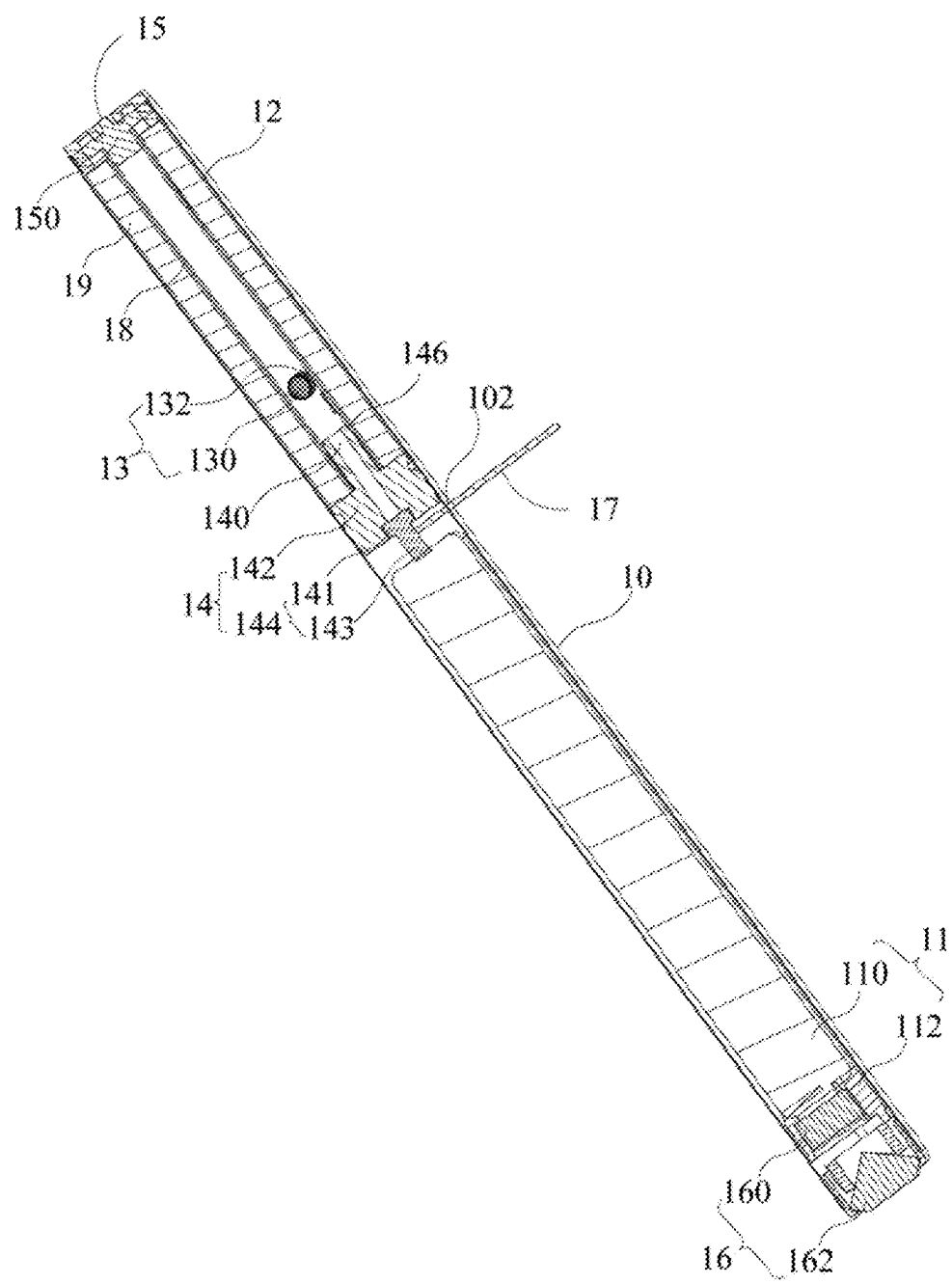
FIG. 2 is a cross-sectional view of the electronic cigarette taken along a line II-II thereof.

Referring to both FIG. 1 and FIG. 2, an electronic cigarette of the first embodiment includes a sleeve 10, a battery module 11, a reservoir 12, an atomizing unit 13, a blocking module 14, a mouthpiece 15, an analog cigarette end 16, a thimble 17 and a ventilation tube 18.

Specifically, the sleeve 10 has a tubular shape, the mouthpiece 15 is disposed on an end of the sleeve 10, and the analog cigarette end 16 is disposed on the other end of the sleeve 10. An air inlet 100 is disposed adjacent to the analog cigarette end 16 on the sleeve 10, when inhaling through the mouthpiece 15, air gets into the sleeve 10 from the air inlet 100, and passes through the ventilation tube 18 and carries the aerosol generated by the atomizing unit 13, and then reaches the mouth of user. The analog cigarette end 16 includes a light-emitting element 160 and a transparent cover 162 which is made of transparent or translucent material. When the light-emitting element 160 is lighted, the electronic cigarette can simulate a combustion state of traditional cigarettes.

The battery module 11 is arranged in the sleeve 10, and is located at the end of the sleeve 10 near the analog cigarette end 16. The light-emitting element 160 is arranged between the transparent cover 162 and the battery module 11. Particularly, the battery module 11 of the first embodiment includes a battery 110, a controller 112, wires and related electronic circuit elements. The battery 110 is spaced away from the sleeve 10, so as to allow the air to flow from the analog cigarette end 16 to the mouthpiece 15. The controller 112 is electrically connected to the battery 110, and the light-emitting element 160 is connected to the controller 112 and the battery 110. When sensing an action of smoking, the controller 112 controls the battery 110 of supplying power to light the light-emitting element 160.

The reservoir 12 is formed in the sleeve 10 and located at the end of the sleeve 10 near the mouthpiece 15, which is configured to contain tobacco liquid provided in the sleeve 10. There are various ways of forming the reservoir 12. In this embodiment, the reservoir 12 is an annular space defined by the ventilation tube 18, the sleeve 10 and the blocking module 14. In particularly, the blocking module 14 is tightly mounted on the sleeve 10. The ventilation tube 18 is provided in the sleeve 10, an end of the ventilation tube 18 is mounted on the blocking module 14, for example, a convex portion 146 protruding toward the mouthpiece 15 is formed on the blocking module 14, and the ventilation tube 18 is stuck by the convex portion 146. The other end of the ventilation tube 18 is communicated with the mouthpiece 15 to allow the air in the sleeve 10 to pass through the ventilation tube 18, and reach the mouthpiece 15. A gap is formed between the outer wall of the ventilation tube 18 and the inner wall of the sleeve 10, the blocking module 14 blocks the bottom of the gap so as to form the reservoir 12.

In order to reduce the possibility of a liquid leakage, the reservoir 12 further includes a carrier configured for absorbing the tobacco liquid, so that the tobacco liquid is reserved in the reservoir 12. In this embodiment, the carrier 19 is an oil-storing cotton which has a tubular shape, the oil-storing cotton is inserted into the sleeve 10, and the ventilation tube 18 is inserted into inner ring of the oil-storing cotton.

The atomizing unit 13 is arranged in the sleeve 10, and is electrically connected to the battery module 11. In particular, the atomizing unit 13 is electrically connected to the battery 110. When sensing the action of smoking, the controller 112 controls the battery 110 of supplying power to the atomizing unit 13 to atomize the tobacco liquid to form aerosol. The atomizing unit 13 may be arranged in the ventilation tube 18 or mounted on the bottom of the ventilation tube 18, such that the aerosol produced by the atomizing unit 13 could pass through the ventilation tube 18, and discharge from the mouthpiece 15.

The atomizing unit 13 includes an absorption element 130 and a heating element 132 in contact with the absorption element 130, at least one end of the absorption element 130, specifically, in this embodiment, two ends of the absorption element 130 extend to the reservoir 12 to suck the tobacco liquid therein and is configured to provide the tobacco liquid for being atomized by the heating element 132.

In this embodiment, the absorption element 130 is a glass-fiber core, the glass-fiber core crosses the ventilation tube 18, and both ends of the glass-fiber core are inserted into the oil-storing cotton for sucking the tobacco liquid. It can be understood that, in other embodiments, the absorption element 130 may also be made of fiber cotton, micro-porous ceramic, porous metal or other micro-porous material which absorbing the tobacco liquid by a capillary action of the micro-porous.

The heating element 132 is a heating wire wrapping around the glass-fiber core, both ends of the heating wire are connected to the electronic circuit elements of the battery module 11. For instance, the heating wire connected to the battery 110 via wires passing through the blocking module 14. In the other embodiments, the heating element 132 may also be a heating plate, a heating film, or a heating coating.

When user inhaling through the mouthpiece 15, the controller 112 senses the action of smoke, that is, the change of airflow, and then controls the battery module 11 to light the light-emitting element 160 and supply power to the heating element 132 for heating the tobacco liquid absorbed by the absorption element 130 to form aerosol at the same time.

It can be known that the atomizing unit 13 atomizes the tobacco liquid by heating in this embodiment. It can be understood that, the atomizing unit 13 may also atomize the tobacco liquid by high frequency vibration of ultrasonic piezoelectric plate, or by combination high frequency vibration of ultrasonic piezoelectric plate and heating.

The blocking module 14 is arranged in the sleeve 10 and configured to isolate the battery module 11 and the reservoir 12. A ventilation hole 140 is disposed on the blocking module 14 for achieving air communication between the atomizing unit 13 and the battery module 11, and the ventilation hole 140 is communicated with the ventilation tube 18.

The blocking module 14 is switchable so as to switch the ventilation hole 140 between a closed state and an open state, the ventilation hole 140 is in the closed state before a first use of the electronic cigarette. When the electronic cigarette is used, the blocking module 14 is switched to make the ventilation hole 140 in the open state, so as to allow air to enter the ventilation hole 140 and pass through the atomizing unit 13 to carry the aerosol generated by the atomizing unit 13.

There are various methods to make the ventilation hole 140 in the open state when using the electronic cigarette. For example, in this embodiment, the blocking module 14 includes a sealing stopper 142 and a plugging block 144, and the outer wall of the sealing stopper 142 matches the inner wall of the sleeve 10 tightly so as to isolate the battery module 11 and the reservoir 12. The ventilation hole 140 is disposed on the sealing stopper 142, specifically, on the axis of the sealing stopper 142. The plugging block 144 is plugged in the ventilation hole 140 such that the ventilation hole 140 is in the closed state before the first use of the electronic cigarette. The ventilation hole 140 is switched to be in the open state when the plugging block 144 is removed from the ventilation hole 140.

Before the first use of the electronic cigarette, that is, during the time the electronic cigarette is produced to the electronic cigarette reaches users, the plugging block 144 is plugged in the ventilation hole 140. The ventilation hole 140 is opened by removing the plugging block 144. It could prevent the tobacco liquid oozed by the absorption element 130 from outflowing from the ventilation hole 140 because of the change of the temperature or air pressure during storing and transportation, and the battery module 11 may not be contaminated. Furthermore, the plugging block 144 may also prevent the air in the side of the battery module 11 from flowing into the ventilation tube 18 and the reservoir 12, which may be conducive to a long-term storage of the electronic cigarette.

In order to prevent the tobacco liquid in the electronic cigarette from spoiling, and keep a long shelf life, a sealing plug 150 is plugged in the mouthpiece 15 after the electronic cigarette is manufactured, such that the air outside can not get into the interior of the electronic cigarette, the oxidization of the tobacco liquid may be avoided.

The plugging block 144 may be removed in different ways. In this embodiment, the thimble 17 is inserted into the sleeve 10 to push the plugging block 144 away from the ventilation hole 140.

Specifically, the sleeve 10 further includes a pinhole 102, which is disposed at a place of the sleeve 10 corresponding to the plugging block 144. The size of the pinhole 102 may be about 1 mm. When using the electronic cigarette, user can insert the thimble 17 into the pinhole 102 and push the plugging block 144 to lift the plugging. And then, the air in the side of the battery module 11 may get into the ventilation tube 18. The controller 112 controls the battery 110 of supplying power to the heating element 132.

In particular, the ventilation hole 140 is a stepped hole, an end of the plugging block 144 is plugged in the stepped hole, and the other end of the plugging block 144 is abutted against the battery module 11 or spaced away from the battery module 11. The plugging block 144 includes a blocking portion 141 matching with the stepped hole and an extending portion 143 extending outward from the blocking portion 141, and the blocking portion 141 has a size smaller than that of the extending portion 143. Hence, the success rate of removing the plugging block 144 is guaranteed when inserting the thimble 17 into the pinhole 102 and pushing the extending portion 143. The shape of the blocking portion 141 and the shape of the extending portion 143 may be same or different.

The sealing stopper 142 may be made of elastic silica gel (or flexible plastic), and the plugging block 144 may be made of elastic silica gel or metal. When the plugging block 144 is being pushed, the sealing stopper 142 is susceptible to be out of shape, and then out from the ventilation hole 140. The wires connected to two ends of the heating element 132 respectively pass through the sealing stopper 142 and connect to the sealing stopper 142 under an interference fit, so as to prevent the tobacco liquid from leaking through the hole where the wires pass through, and prevent the air from flowing through the hole where the wires passing through.

Figure 3:
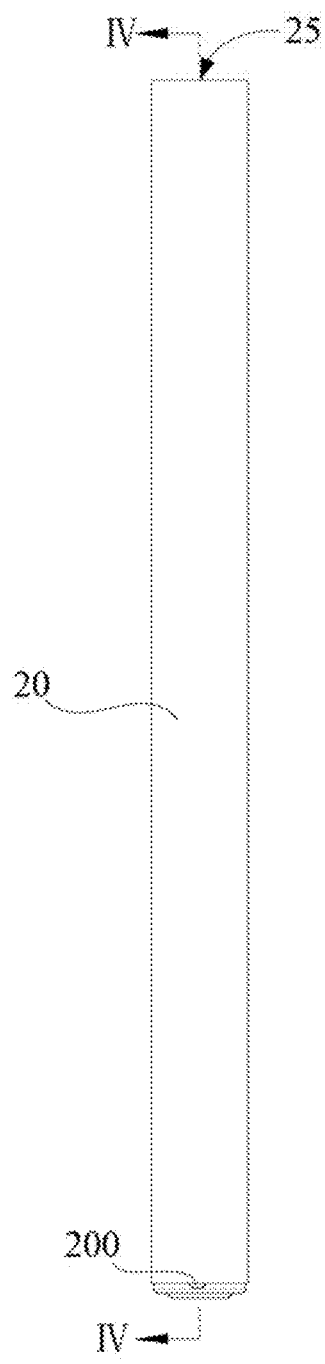
FIG. 3 is a perspective view of an electronic cigarette according to a second embodiment of the disclosure.
Figure 4:
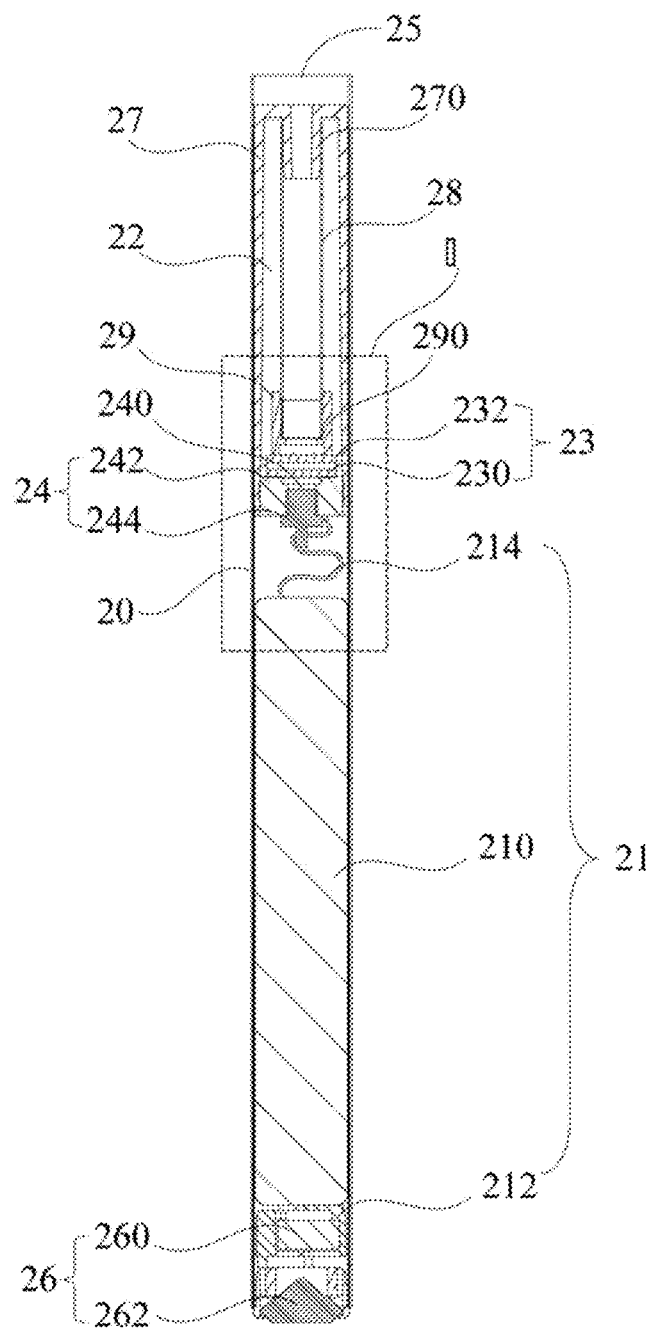
FIG. 4 is a cross-sectional view of the electronic cigarette taken along a line of IV-IV thereof.
Figure 5:
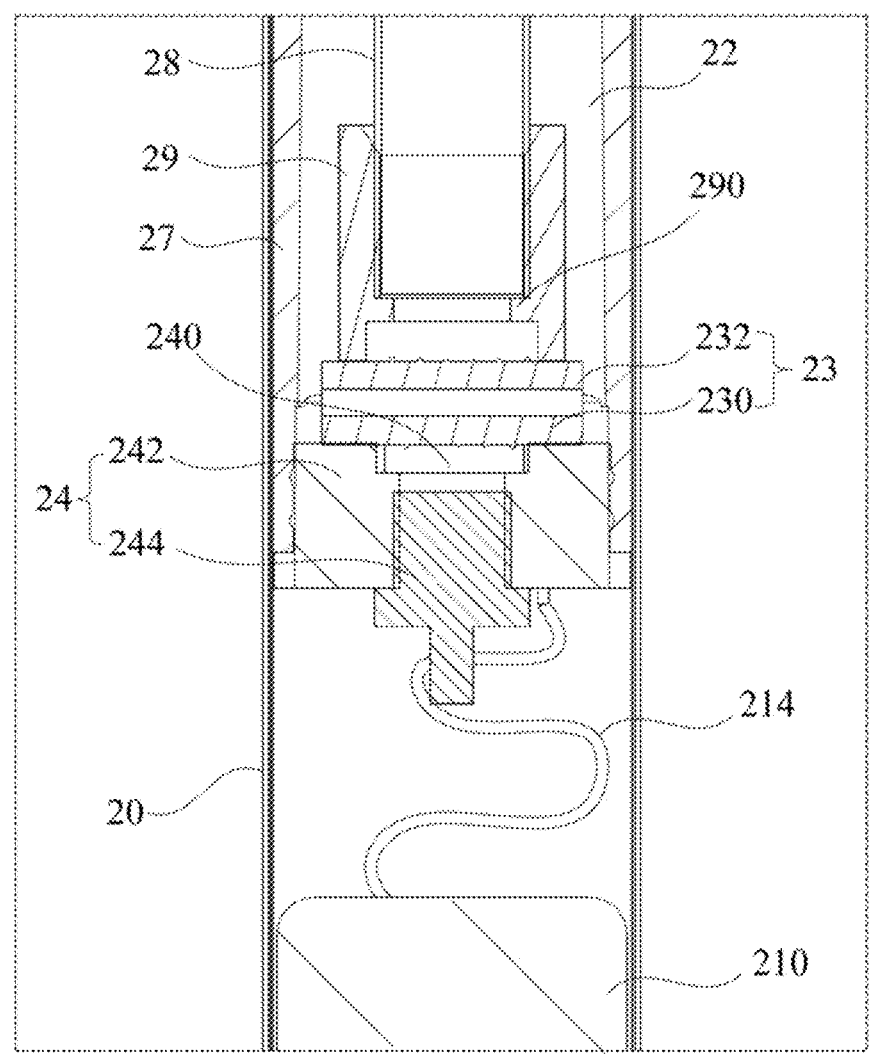
FIG. 5 is an enlarged view of region V shown in FIG. 3.

Referring to FIG. 3, FIG. 4 and FIG. 5, the electronic cigarette of this embodiment includes a sleeve 20, a battery module 21, a reservoir 22, an atomizing unit 23, a blocking module 24, a mouthpiece 25 and an analog cigarette end 26.

Specifically, the sleeve 20 has a tubular shape, the mouthpiece 25 is disposed at an end of the sleeve 20, and the analog cigarette end 26 is disposed at the other end of the sleeve 20. An air inlet 200 is disposed adjacent to the analog cigarette end 26 on the sleeve 20. When inhaling through mouthpiece 25, air gets into the sleeve 20 from the air inlet 200, and passes through the ventilation tube 28 and carries the aerosol generated by the atomizing unit 23, and then reaches the mouth of user. The analog cigarette end 26 includes a light-emitting element 260 and a transparent cover 262 which is made of transparent or translucent material. When the light-emitting element 260 is lighted, the electronic cigarette can simulate the combustion state of traditional cigarettes.

The battery module 21 is arranged in the sleeve 20, and is located at an end of the sleeve 20 near the analog cigarette end 26. Particularly, the battery module 21 includes a battery 210, a controller 212, a wire 214 and related electronic circuit elements. The battery 210 and the sleeve 20 are spaced by a certain distance, so as to allow the air to flow from the analog cigarette end 26 to the mouthpiece 25. The controller 212 is electrically connected to the battery 210, and the light-emitting element 260 is connected to the controller 212 and the battery 210. When sensing an action of smoking, the controller 212 controls the battery 210 of supplying power to light the light-emitting element 260.

The reservoir 22 is formed in the sleeve 20 and located near the mouthpiece 25, which is configured to contain tobacco liquid.

The atomizing unit 23 is arranged in the sleeve 20, and is electrically connected to the battery module 21. In particular, the atomizing unit 23 is electrically connected to the battery 210, when sensing the action of smoking, the controller 212 controls the battery 210 of supplying power to the atomizing unit 23 to atomize the tobacco liquid to form aerosol.

The atomizing unit 23 includes an absorption element 230 and a heating element 232 in contact with the absorption element 230, at least one end of the absorption element 230, specifically, in this embodiment, two ends of the absorption element 230 extend to the reservoir 22 to suck the tobacco liquid therein and is configured to provide the tobacco liquid for being atomized by the heating element 232.

The absorption element 230 of the embodiment is a micro-porous ceramic rod, the heating element 232 is a heating wire wrapping around the micro-porous ceramic rod. Particularly, the micro-porous ceramic rod has a plurality of pores inside, and a hole is disposed on the center of the micro-porous ceramic rod, from which the tobacco liquid can flow into the micro-porous ceramic rod. Specifically, the tobacco liquid permeates from both ends of the micro-porous ceramic rod to the center gradually, and is heated to form aerosol by the heating wire outside of the micro-porous ceramic rod, and finally, the aerosol is carried by the air.

The blocking module 24 is arranged in the sleeve 20 and configured to isolate the battery module 21 and reservoir 22. A ventilation hole 240 is disposed on the blocking module 24 for achieving air communication between the atomizing unit 23 and the battery module 21.

The blocking module 24 is switchable so as to switch the ventilation hole 240 between a closed state and an open state, the ventilation hole 240 is in the closed state before a first use of the electronic cigarette. When the electronic cigarette is used, the blocking module 24 is switched to make the ventilation hole 240 in the open state, so as to allow air to enter the ventilation hole 240 and pass through the atomizing unit 23 to carry the aerosol generated by the atomizing unit 23.

Particularly, the blocking module 24 of the embodiment includes a sealing stopper 242 and a plugging block 244, the sealing stopper 242 is configured to isolate the battery module 21 and the reservoir 22, the ventilation hole 240 is disposed on the sealing stopper 242, specifically, the axis of the sealing stopper 242. The plugging block 244 is plugged in the ventilation hole 240 such that the ventilation hole 240 is in the closed state before the first use of the electronic cigarette.

In the second embodiment, the ventilation hole 240 is also switched to be in the open state when the plugging block 244 is removed from the ventilation hole 240. However, the difference between the second embodiment and the first embodiment is that user can remove the plugging block 244 with hand.

Obviously, when the plugging block 244 is plugged in the ventilation hole 240, the plugging block 244 is inside of the sleeve 20, a side of the plugging block 244 is blocked by the battery module 21, the other side of the plugging block 244 is blocked by other elements such as the sealing stopper 242 and the atomizing unit 23, therefore, it can not be realized that unplugging the plugging block 244 directly.

In order to unplug the plugging block 244, the reservoir 22, the atomizing unit 23 and the sealing stopper 242 are assembled to form an integral atomizing assembly, which is detachably arranged in the sleeve 20 such that the atomizing assembly can be taken out from the sleeve 20 to unplug the plugging block 244 from the ventilation hole 240 when using the electronic cigarette.

For instance, the electronic cigarette of the second embodiment further includes an oil cup 27, a ventilation tube 28 and a connecting base 29. The reservoir 22 in this embodiment is an annular space defined by the oil cup 27, the ventilation tube 28, the connecting base 29, and the blocking module 24.

Specifically, the oil cup 27 is detachably arranged in the sleeve 20. In one embodiment, the outer wall of the oil cup 27 is made of elastic material, and is mounted on the sleeve 20 tightly. In other embodiments, screw thread is formed on both the outer wall of the oil cup 27 and the inner wall of the sleeve 20. The oil cup 27 and the sleeve 20 are in threaded connection, such that the oil cup 27 can be unscrewed from the sleeve 20 or threaded into the sleeve 20.

The atomizing assembly of this embodiment is arranged in the oil cup 27. The detachably connecting between the oil cup 27 and the sleeve 20 make the detachably connecting between the atomizing assembly and the sleeve 20 realize.

Specifically, the oil cup 27 has a cylinder shape, the oil cup 27 is detachably arranged in an end of the sleeve 20 near the mouthpiece 25. An end of the oil cup 27 near the mouthpiece 25 extends inward to form a hollow protrusion 270, and the other end of the oil cup 27 is designed to be an opening. The sealing stopper 242 is mounted into the opening of the oil cup 27 tightly. The connecting base 29 is hollow, and a locking ring 290 bulged from the bottom of the connecting base 29 is formed in the connecting base 29. The ventilation tube 28 is arranged in the oil cup 27. An end of the ventilation tube 28 is mounted on the connecting base 29, and communicated with the ventilation hole 240. The other end of the ventilation tube 28 is connected to the end of the oil cup 27 near the mouthpiece 25, and communicated with the mouthpiece 25 to allow the air in the sleeve 20 to reach the mouthpiece 25 through the ventilation tube 28. In particular, an end of the ventilation tube 28 is inserted into the connecting base 29 and is limited by the locking ring 290. The other end of the ventilation tube 28 is engaged with the hollow protrusion 270 and is stuck by the hollow protrusion 270. There is a gap between the outer wall of the ventilation tube 28 and the connecting base 29 and the inner wall of the oil cup 27, the sealing stopper 242 blocks the bottom of the gap so as to form the reservoir 12. The atomizing unit 23 is fixed between the sealing stopper 242 and the connecting base 29, the heating wire is arranged in the ventilation tube 28.

In this embodiment, the atomizing unit 23 is electrically connected to the battery module 21 via the wire 214, the wire 214 has a length larger than an axial length of the atomizing assembly, such that the atomizing assembly can be taken out from the sleeve 20 to unplug the plugging block 244. In particular, the length of the wire 214 is 1.2 to 2 times of the axial length of the atomizing assembly. Since the wire 214 is long, a space is formed to contain the wire 214 in the sleeve 20.

It can be understood that, in other embodiments, the atomizing unit 23 is electrically connected to the battery module 21 via an electrode terminal. That is, positive and negative terminals are disposed on both of the atomizing unit 23 and the battery module 21 correspondingly. The electrode terminal mentioned above may be double PIN electrode terminals, electrode collar, pins, spring needles, conductive spring, leaf spring or other common contact conductive structure.

Figure 6:
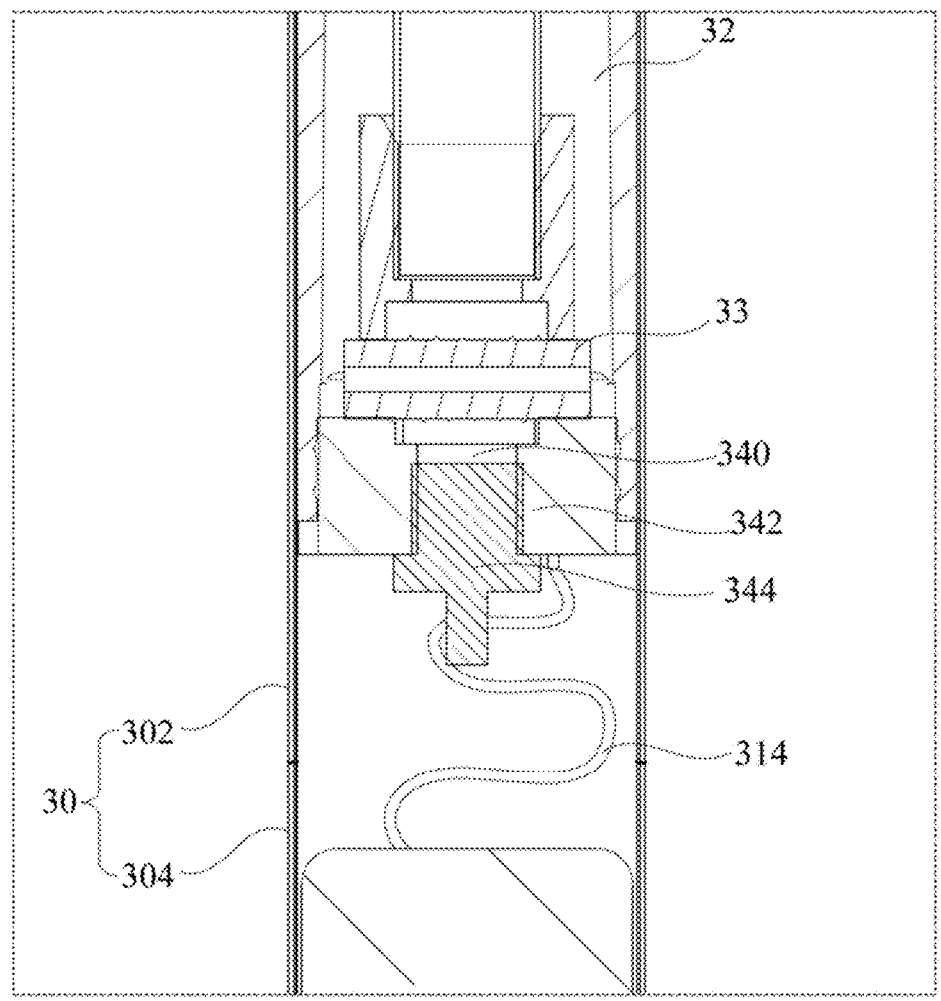
FIG. 6 is an enlarged view of a region according to a third embodiment of the disclosure.

Referring to FIG. 6, like the second embodiment, user could also remove the plugging block 244 with hand to open the ventilation hole 340 in the third embodiment. However, the way of removing the plugging block 344 in the third embodiment is: the sleeve 30 is designed to be a two-stage sleeve, the plugging block 344 is unplugged after the two-stage sleeve 30 is separated from each other.

Specifically, the difference between the structure of the electronic cigarette in this embodiment and that in the second embodiment is: in this embodiment, the sleeve 30 includes a first sub-sleeve 302 and a second sub-sleeve 304 which are detachably connected to each other. The reservoir 32, the atomizing unit 33, the sealing stopper 342 and the plugging block 344 are assembled in the first sub-sleeve 302, while the battery module is assembled in the second sub-sleeve 304, and the plugging block 344 is removable under a condition of the first sub-sleeve 302 and the second sub-sleeve 304 being separated from each other. In comparison with the second embodiment, the length of the wire in this embodiment can be reduced greatly. The first sub-sleeve 302 and the second sub-sleeve 304 can be detachably connected through screw thread, buckle or magnetic suction.

Figure 7:
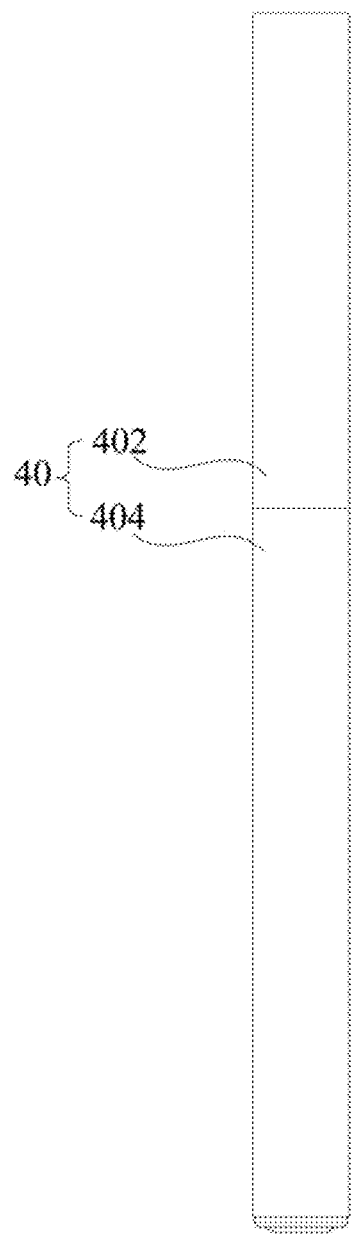
FIG. 7 is a side view of an electronic cigarette according to a fourth embodiment of the disclosure.
Figure 8:
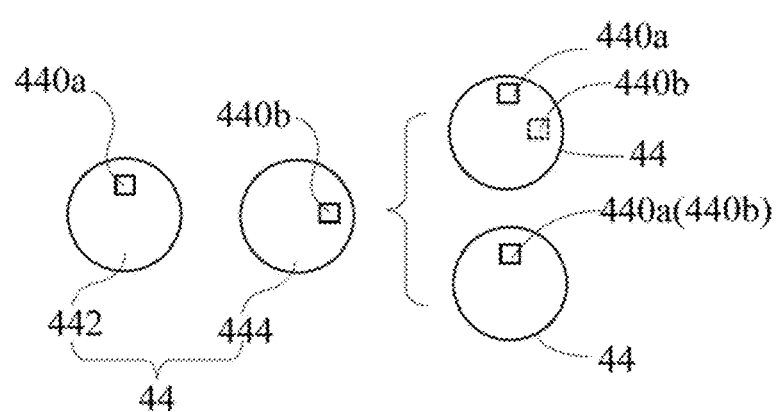
FIG. 8 is a schematic diagram of the end face of blocking module of the fourth embodiment according to the disclosure.

Referring to FIG. 7 and FIG. 8, in comparison with the embodiments mentioned above, the sleeve 40 in the forth embodiment is divided into two sections that are connected rotatably to each other, the ventilation hole can be switched between a closed state and an open state by rotating the two sections of the sleeve 40 relatively to each other.

In particular, the sleeve 40 includes a first sub-sleeve 402 and a second sub-sleeve 404 which are connected rotatably to each other, the profile schematic diagram of the first sub-sleeve 402 and the second sub-sleeve 404 is showed in the left of the FIG. 8.

The blocking module 44 includes a first sub-block 442 having a first through hole 440a and a second sub-block 444 having a second through-hole 440b. The shapes, the positions and the relative angles of the first through-hole 440a and the second through-hole 440b are not the limitation of the present disclosure. The ventilation hole is composed by the first through-hole 440a and the second through-hole 440b when the first through-hole 440a and the second through-hole 440b align with each other.

The first sub-block 442 is arranged in the first sub-sleeve 402, the second sub-block 444 is arranged in the second sub-sleeve 404.

The first through-hole 440a of the first sub-block 442 and the second through-hole 440b of the second sub-block 444 are deviated from each other before the first use of the electronic cigarette so that the ventilation hole is in the closed state, showed in the upper right of FIG. 8. When using the electronic cigarette, first sub-sleeve 402 and the second sub-sleeve 404 are rotated relatively to each other to align the first through-hole 440a of the first sub-block 442 and the second through-hole 440b of the second sub-block 444 with each other, such that the ventilation hole could be in the open state, which is showed in the lower right of FIG. 8.

In conclusion, what one skilled in the art can understand, a blocking module is arranged in the sleeve to isolate the battery module and the reservoir, which may guarantee an excellent sealing of the electronic cigarette before the first use of the electronic cigarette to make sure that the tobacco liquid would not leak no matter how the air pressure and temperature change, therefore, the safety and reliability of the electronic cigarette are increased. Furthermore, the electronic cigarette of the present disclosure can prevent the air from getting into the sleeve, and prevent the tobacco liquid oozed from the atomizing unit, hence the time for storing can be extended, and the operating costs of an enterprise can be reduced. When the electronic cigarette is used, what needs to do is switching the blocking module to make the ventilation hole in an open state to allow air to flow into the sleeve, which is convenient and time-saving.

The above description depicts merely some exemplary embodiments of the disclosure, but is meant to limit the scope of the disclosure. Any equivalent structure or flow transformations made to the disclosure, or any direct or indirect applications of the disclosure on other related fields, shall all be covered within the protection of the disclosure.

What is claimed is:

1. An electronic cigarette, comprising:
   a sleeve, an end of which is provided with a mouthpiece, and the other end of which is provided with an analog cigarette end;
   a battery module, arranged in the sleeve;
   a reservoir, formed in the sleeve and configured to contain tobacco liquid;
   an atomizing unit, arranged in the sleeve, wherein the atomizing unit is electrically connected to the battery module, and is configured to atomize the tobacco liquid to form aerosol; and
   a blocking module, arranged in the sleeve and configured to isolate the battery module and the reservoir, wherein a ventilation hole is disposed on the blocking module for achieving air communication between the atomizing unit and the battery module;
   wherein the blocking module is switchable so as to switch the ventilation hole between a closed state and an open state, the ventilation hole is in the closed state before a first use of the electronic cigarette; when the electronic cigarette is used, the blocking module is switched to make the ventilation hole in the open state, so as to allow air to enter the ventilation hole and pass through the atomizing unit to carry the aerosol generated by the atomizing unit;
   wherein the blocking module comprises a plugging block plugged in the ventilation hole such that the ventilation hole is in the closed state before the first use of the electronic cigarette;
   wherein the ventilation hole is switched to be in the open state when the plugging block is removed out of the ventilation hole.

2. The electronic cigarette of claim 1, wherein the blocking module further comprises:
   a sealing stopper, configured to isolate the battery module and the reservoir, wherein the ventilation hole is disposed on the sealing stopper.

3. The electronic cigarette of claim 2, wherein the electronic cigarette further comprises a thimble, and the sleeve further comprises a pinhole disposed at a place thereof corresponding to the plugging block, the thimble is configured to insert into the pinhole and push the plugging block away from the ventilation hole.

4. The electronic cigarette of claim 3, wherein the ventilation hole is a stepped hole, an end of the plugging block is plugged in the stepped hole, the other end of the plugging block is abutted against the battery module or spaced away from the battery module;
   the plugging block comprises a blocking portion matching with the stepped hole and an extending portion extending outward from the blocking portion, and the blocking portion has a size smaller than that of the extending portion.

5. The electronic cigarette of claim 2, wherein the sleeve comprises a first sub-sleeve and a second sub-sleeve which are detachably connected to each other; the reservoir, the atomizing unit and the block module are assembled in the first sub-sleeve, the battery module is assembled in the second sub-sleeve; and the plugging block is removable under a condition of the first sub-sleeve and the second sub-sleeve being separated from each other.

6. The electronic cigarette of claim 2, wherein the reservoir, the atomizing unit and the sealing stopper are assembled to form an integral atomizing assembly, the atomizing assembly is detachably arranged in the sleeve such that the atomizing assembly can be taken out from the sleeve to unplug the plugging block from the ventilation hole when using the electronic cigarette.

7. The electronic cigarette of claim 6, wherein the atomizing unit is electrically connected to the battery module via a wire, the wire has a length larger than an axial length of the atomizing assembly.

8. The electronic cigarette of claim 7, wherein the length of the wire is 1.2 to 2 times of the axial length of the atomizing assembly.

9. The electronic cigarette of claim 2, wherein the sealing stopper is made of elastic silica gel, and the plugging block is made of elastic silica gel or metal.

10. The electronic cigarette of claim 1, wherein the atomizing unit is electrically connected to the battery module via an electrode terminal.

11. The electronic cigarette of claim 1, wherein the atomizing unit comprises an absorption element and a heating element in contact with the absorption element, at least one end of the absorption element extends to the reservoir to suck the tobacco liquid therein and is configured to provide the tobacco liquid for being atomized by the heating element.

12. The electronic cigarette of claim 11, wherein the liquid absorbing element is a micro-porous ceramic rod, and the heating element is a heating wire wrapping around the micro-porous ceramic rod.

13. The electronic cigarette of claim 12, wherein the electronic cigarette further comprises a ventilation tube arranged in the sleeve, an end of the ventilation tube is mounted on the blocking module and communicated with the ventilation hole, and the other end of the ventilation tube is communicated with the mouthpiece; the ventilation tube, the sleeve and the blocking module define an annular space as the reservoir, and the heating element is arranged in the ventilation tube.

14. The electronic cigarette of claim 12, wherein the electronic cigarette further comprises an oil cup, a connecting base and a ventilation tube;
   the oil cup is detachably arranged in an end of the sleeve near the mouthpiece, the blocking module is tightly mounted on an end of the oil cup far away from the mouthpiece;
   the connecting base is arranged in the oil cup, and is mounted on the blocking module;
   the ventilation tube is arranged in the oil cup, an end of the ventilation tube is mounted on the connecting base, and is communicated with the ventilation hole, and the other end of the ventilation tube is mounted on the end of the oil cup near the mouthpiece, and is communicated with the mouthpiece;
   the heating element is arranged in the ventilation tube; and
   the connecting base, ventilation tube, oil cup and the blocking module define an annular space as the reservoir.

15. The electronic cigarette of claim 14, wherein the connecting base is hollow, in which a locking ring is disposed, the end of the ventilation tube is inserted into the connecting base and is limited by the locking ring; the end of the oil cup near the mouthpiece extends inward to form a hollow protrusion, the other end of the ventilation tube is stuck by the protrusion.

16. The electronic cigarette of claim 1, wherein the reservoir further comprises a carrier configured to absorb the tobacco liquid, wherein the carrier has a tubular shape and is inserted into the sleeve.

17. The electronic cigarette of claim 16, wherein the carrier is an oil-storing cotton.

18. The electronic cigarette of claim 1, wherein the analog cigarette end comprises a light-emitting element and a transparent cover, and the light-emitting element is arranged between the transparent cover and the battery module.

19. The electronic cigarette of claim 18, wherein the battery module comprises:
a battery; and
a controller electrically connected to the battery, wherein the controller is configured to light the light-emitting element and control the atomizing unit to atomize the tobacco liquid when sensing an action of smoking.

* * * * *